US012704424B1

(12) United States Patent
Glowala et al.

(10) Patent No.: US 12,704,424 B1
(45) Date of Patent: Aug. 11, 2026

(54) ROTATING MACHINES TORQUE MEASUREMENT SYSTEM FOR AXIALLY LIMITED APPLICATIONS

(71) Applicants: GENERAL ELECTRIC COMPANY, Evendale, OH (US); GE AEROSPACE POLAND sp. z o. o., Warsaw (PL)

(72) Inventors: Mateusz Glowala, Garwolin (PL); Arthur W. Sibbach, Boxford, MA (US)

(73) Assignees: GENERAL ELECTRIC COMPANY, Evendale, OH (US); GE AEROSPACE POLAND sp. z o. o., Warsaw (PL)

( * ) Notice: Subject to any disclaimer, the term of this patent is extended or adjusted under 35 U.S.C. 154(b) by 0 days.

(21) Appl. No.: 19/180,508

(22) Filed: Apr. 16, 2025

(51) Int. Cl.
*G01L 3/00* (2006.01)
*G01L 3/10* (2006.01)

(52) U.S. Cl.
CPC .................................... *G01L 3/109* (2013.01)

(58) Field of Classification Search
CPC ....................................................... G01L 3/109
See application file for complete search history.

(56) References Cited

U.S. PATENT DOCUMENTS 4,150,566 A * 4/1979 Loebel .................... G01L 3/101 73/862.328
5,390,549 A 2/1995 Dobler et al.
5,442,965 A 8/1995 Halen
5,731,529 A 3/1998 Nicot
5,918,286 A 6/1999 Smith et al.
6,795,779 B2 9/2004 Delvaux et al.
7,275,450 B2 10/2007 Hirai et al.
10,677,670 B2 6/2020 Renault
10,797,568 B2 10/2020 Ohzu et al.

FOREIGN PATENT DOCUMENTS

EP 0144803 A2 6/1985
EP 1298032 A2 * 4/2003 ............. G01L 5/221
JP 2015087154 A * 5/2015
WO WO-2005090937 A1 * 9/2005 ............. G01L 3/104

OTHER PUBLICATIONS

Extended European Search Report issued in corresponding application EP 25172097.5 dated Oct. 16, 2025.

* cited by examiner

*Primary Examiner* — Jamel E Williams
(74) *Attorney, Agent, or Firm* — Carter, DeLuca & Farrell LLP

(57) ABSTRACT

A rotating machine torque measurement system includes a shaft assembly and spaced sensors. The shaft assembly includes a first shaft that is adapted to connect to a torque generating device, a second shaft that has a second end that is secured to a second end of the first shaft, and a third shaft that has a first end that is secured to a first end of the second shaft and is adapted to connect to a torque receiving device. The first, second, and third shafts are coaxial and can twist or angularly deform in relation to each other in response to a load applied to the shaft assembly. The sensors are positioned at the first and second ends of the shaft assembly to measure angular deformation of the shaft assembly.

20 Claims, 3 Drawing Sheets

ROTATING MACHINES TORQUE MEASUREMENT SYSTEM FOR AXIALLY LIMITED APPLICATIONS

TECHNICAL FIELD

This disclosure relates to torque measurement systems, and more particularly, to torque measurement systems having phase shift torque sensors.

BACKGROUND

The measurement of torque in rotating machine systems provides key information for design engineers to improve the system efficiency. One type of torque measurement system includes phase shift torque sensors which have proven to be reliable in different environmental conditions. Phase shift torque sensors require a certain angle of relative twist or angular deformation between a torque transmitting device and a torque receiving device to accurately determine torque under variable loads. Where there is not enough relative twist between the torque transmitting device and the torque receiving device to accurately measure torque, the length of the shaft can be increased and/or the thickness of the shaft can be reduced to increase twist. However, reducing the thickness of the shaft may be difficult or impractical because of load requirements, and increasing the length of the shaft may be impractical because of space limitations.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying drawings of which.

Figure 1:
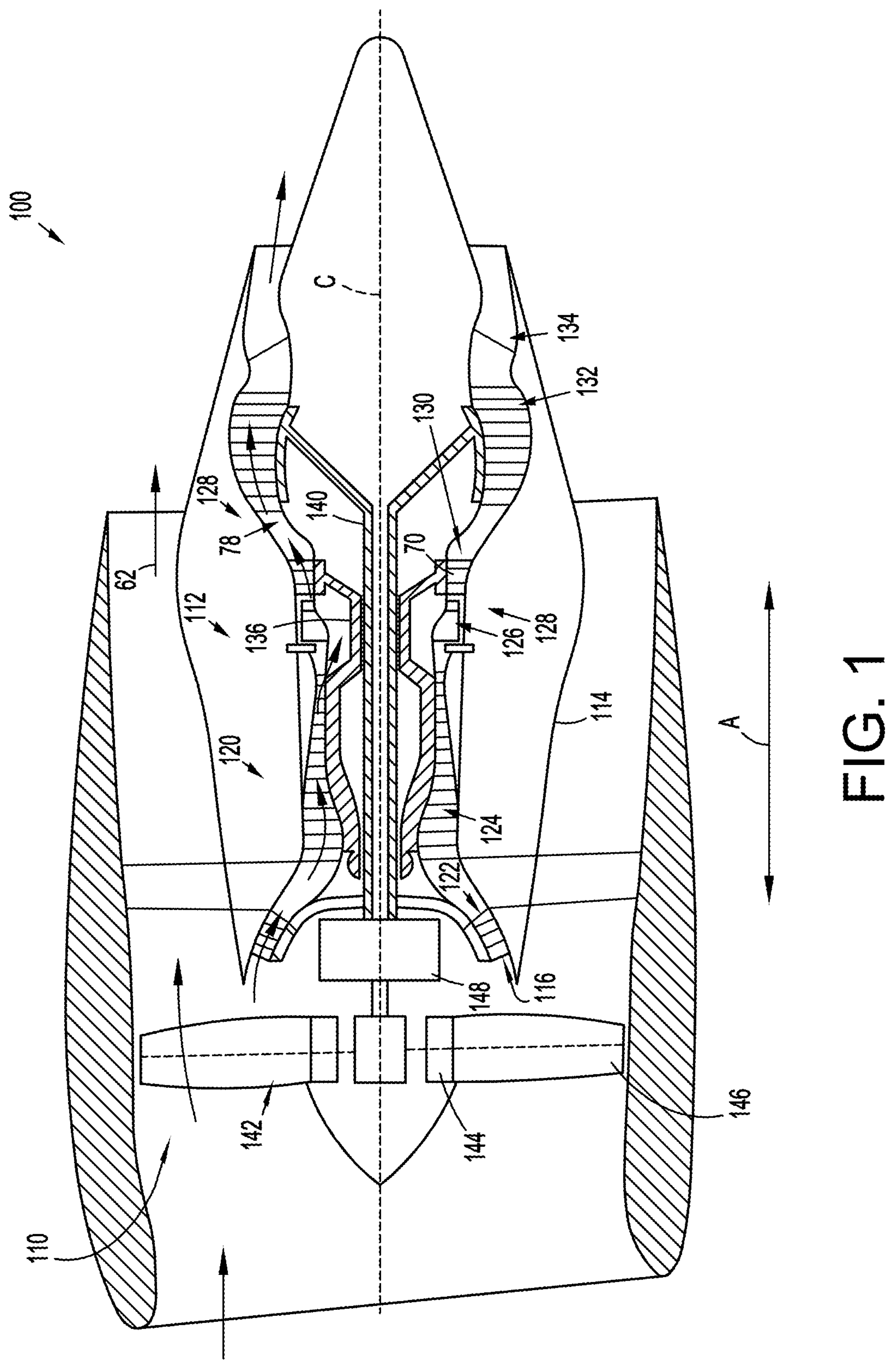
FIG. 1 is a schematic cross-sectional diagram of a ducted turbine engine, taken along a centerline axis of the turbine engine, according to an embodiment of the present disclosure.

Further exemplary aspects of the disclosure are described in more detail below with reference to the appended figures. Aspects of this disclosure may be combined without departing from the scope of the disclosure.

DETAILED DESCRIPTION

Reference will now be made in detail to embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" as may be used herein refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

The terms "upstream" and "downstream" refer to the relative direction with respect to fluid flow in a fluid pathway. For example, "upstream" refers to the direction from which the fluid flows, and "downstream" refers to the direction to which the fluid flows.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. Accordingly, connection references do not necessarily infer that two elements are directly connected and in fixed relation to one another. The exemplary drawings are for the purposes of illustration only and the dimensions, positions, order and relative sizes reflected in the drawings attached hereto can vary.

As used herein, the terms "first," "second," "third," etc. may be used interchangeably to distinguish one component from another and are not intended to signify location or importance of the individual components. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, descriptors are used merely for ease of referencing multiple elements or components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Although this disclosure will be described in terms of specific aspects, it will be readily apparent to those skilled in this art that various modifications, rearrangements, and substitutions may be made without departing from the spirit of this disclosure.

To promote an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ this disclosure in any appropriately detailed structure.

The phrases "in an aspect," "in aspects," "in various aspects," "in some aspects," "in other aspects," or the like, may each refer to one or more of the same or different aspects in accordance with this disclosure.

Approximating language, as used herein, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values, and/or endpoints defining range(s) of values.

In general, the disclosed rotating machine torque measurement system may be in the form of an aviation engine torque measurement system. FIG. 1 is a schematic cross-sectional diagram of a ducted turbine engine 100, taken along a centerline axis C of the turbine engine 100. In general, the turbine engine 100 includes a fan section 110 and a core turbine engine 112 disposed downstream from the fan section 110. The core turbine engine 112 depicted generally includes an outer casing 114 that is substantially tubular and defines an annular inlet 116. As schematically shown in FIG. 1, the outer casing 114 encases, in serial flow relationship, a compressor section 120 including a booster or a low pressure (LP) compressor 122 followed downstream by a high pressure (HP) compressor 124, a combustion section 126, a turbine section 128 including a high pressure (HP) turbine 130 followed downstream by a low pressure (LP) turbine 132, and a jet exhaust nozzle section 134. A high pressure (HP) shaft 136 drivingly connects the HP turbine 130 to the HP compressor 124 to rotate the HP turbine 130 and the HP compressor 124 in unison. A low pressure (LP) shaft 140 drivingly connects the LP turbine 132 to the LP compressor 122 to rotate the LP turbine 132 and the LP compressor 122 in unison. The compressor section 120, the combustion section 126, the turbine section 128, and the jet exhaust nozzle section 134 together define a core air flow path. The fan section 110 includes a fan 142 having a hub 144 and fan blades 146 that extend outwardly from the hub 144. The LP shaft 140 is coupled to the fan hub 144 via a power gearbox 148 to power the fan 142. The power gearbox 148 adjusts the speed of the fan section 110 relative to the LP shaft 140 to a more efficient rotational speed.

Figure 2:
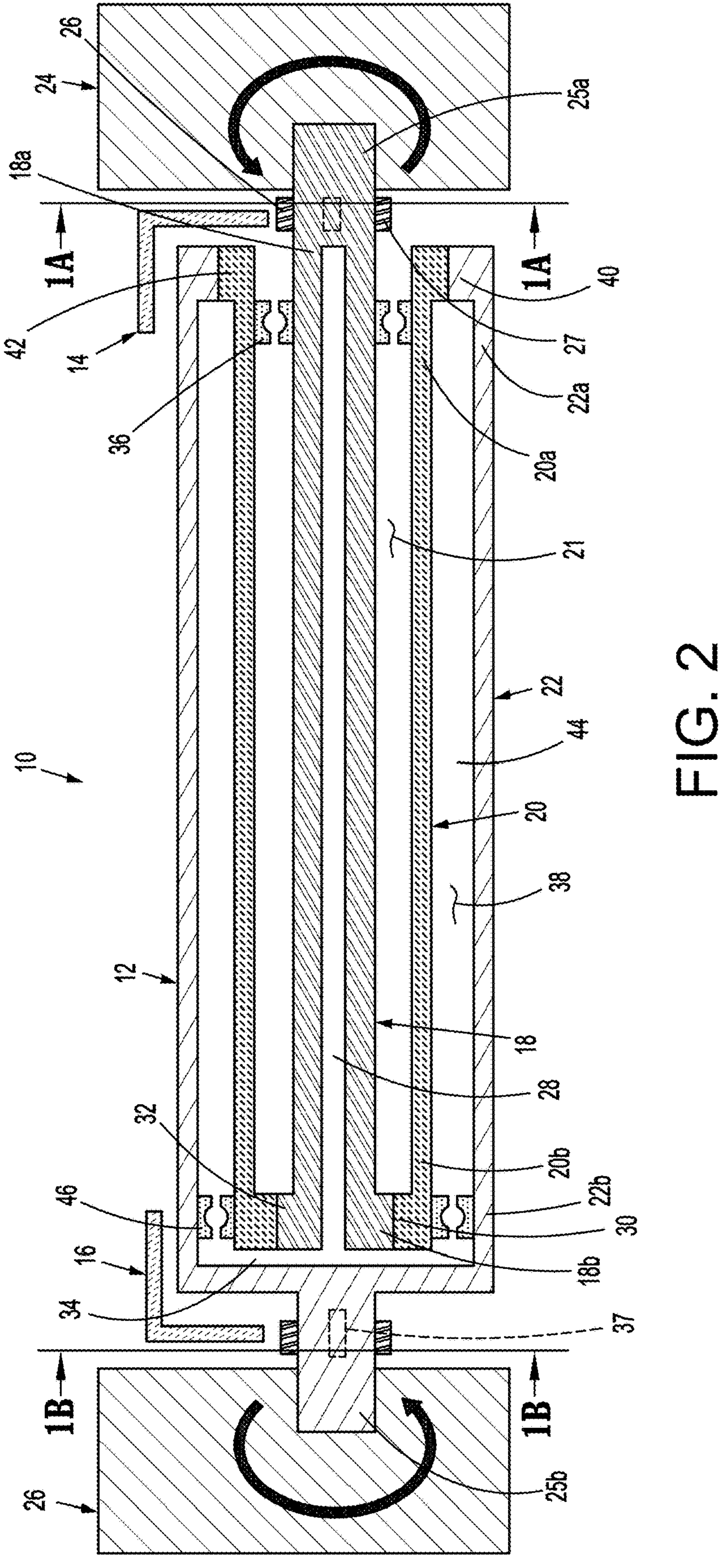
FIG. 2 is a side cross-sectional view of a torque measurement system including aspects of the disclosure.
Figure 2A:
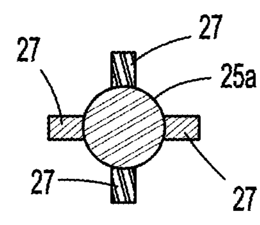
FIG. 2A is a cross-sectional view taken along section line 1A-1A of FIG. 1.
Figure 2B:
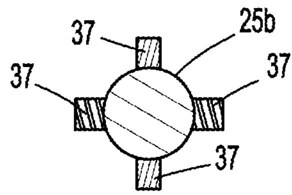
FIG. 2B is a cross-sectional view taken along section line 1B-1B of FIG. 1.

FIG. 2 illustrates a rotating machine torque measurement system 10 that generally includes a load coupling shaft assembly 12 (hereinafter "shaft assembly 12"), a first sensor 14, and a second sensor 16. The shaft assembly 12 includes a plurality of shafts that are coaxially positioned in relation to each other. In aspects of the disclosure, the shaft assembly 12 has a first end, e.g., aft end 25*a*, coupled to a torque generating device 24, e.g., a gas turbine engine (FIG. 1), an electric motor, or a rotating device capable of transmitting torque, and a first end, e.g., forward end 25*b*, coupled to a torque receiving device 26, e.g., an electric generator, a pump, a generator, a compressor, or a turbine engine.

In aspects of the disclosure, the shaft assembly 12 includes a plurality of shafts including a first shaft 18, a second shaft 20, and a third shaft 22. The first shaft 18 has a first end, e.g., an aft end portion 18*a*, that is adapted to be coupled to the torque generating device 24 and a second end portion, e.g., forward end portion 18*b*, that is spaced longitudinally from the aft end portion 18*a*. The aft end portion 18*a* of the first shaft 18 supports or includes reference targets 27 that are monitored by the first sensor 14 as described in further detail below. In some aspects of the disclosure, the first shaft 18 defines a hollow bore 28 that extends from the forward end portion 18*b* of the first shaft 18 towards the aft end portion 18*a* of the first shaft 18 and allows for increased angular deformation or twist of the first shaft 18 as compared to a solid shaft for a given load. In some aspects of the disclosure, the hollow bore 28 extends through the entire length of the first shaft 18. It is envisioned that the first shaft 18 can be a solid shaft.

The second shaft 20 has a cylindrical configuration and includes a first end portion, e.g., an aft end portion 20*a*, and a second end portion, e.g., forward end portion 20*b*. The second shaft 20 defines a cylindrical cavity 21 that receives the first shaft 18. In some aspects of the disclosure, the forward end portion 20*b* of the second shaft 20 is secured to the forward end portion 18*b* of the first shaft 18. The aft end portions 18*a* and 20*a* of the first and second shafts 18 and 20, respectively, are not secured together and can move, i.e., twist, in relation to each other.

In aspects of the disclosure, the forward end portion 20*b* of the second shaft 20 includes an inwardly extending annular flange 30 and the forward end portion 18*b* of the first shaft 18 includes an outwardly extending annular flange 32 that is secured to the inwardly extending annular flange 30 of the second shaft 20 to secure the first shaft 18 to the second shaft 20. In some aspects of the disclosure, the outwardly extending flange 32 of the first shaft 18 is welded to the inwardly extending flange 30 of the second shaft 20 to secure the forward end portions 18*b* and 20*b* of the first and second shafts 18 and 20, respectively, to each other. It is envisioned that the first shaft 18 can be coupled or secured to the second shaft 20 using other known securement techniques including using splines, press-fitting, or with rivets. The inwardly and outwardly extending flanges 30 and 32 increases the spacing between the first shaft 18 and the second shaft 20 to define an annular cavity 34 between the first and second shafts 18 and 20.

In some aspects of the disclosure, one or more bearings or dampers 36 are positioned in the annular cavity 34 between the first and second shafts 18 and 20. In some aspects of the disclosure, the bearings or dampers 36 are positioned adjacent the aft end portions 18*a* and 20*a* of the first and second shafts 18 and 20. The bearings or dampers 36 maintain longitudinal alignment between the first and second shafts 18 and 20 and absorb and minimize vibration. Alternately, it is envisioned that the first shaft 18 can have an outer diameter that closely corresponds to an inner diameter of the second shaft 20 such that width of the annular cavity 34 is minimized. In this configuration, the bearings or dampers 36 may not be necessary, and the inwardly and outwardly extending annular flanges 30 and 32 can be eliminated or have widths of minimal thicknesses.

The third shaft 22 has a cylindrical configuration and includes a first end portion, e.g., aft end portion 22*a*, and a second end portion, e.g., forward end portion 22*b*. The forward end portion 18*a* of the third shaft 22 supports or includes reference targets 37 that are monitored by the second sensor 16 as described in further detail below. The third shaft 22 defines a cylindrical cavity 38 that receives the second shaft 20 and the first shaft 18. In aspects of the disclosure, the first shaft 18 is confined within the second shaft 20, and the second shaft 20 is confined within the third shaft 22. In some aspects of the disclosure, the aft end portion 22*a* of the third shaft 22 is secured to the aft end portion 20*a* of the second shaft 20, and the forward end portions 20*b* and 22*b* of the second and third shafts 20 and 22, respectively, are not secured together and can move, i.e., twist, in relation to each other.

In certain aspects of the disclosure, the aft end portion 22*a* of the third shaft 22 includes an inwardly extending annular flange 40 and the aft end portion 22*b* of the second shaft 20 includes an outwardly extending annular flange 42 that is secured to the inwardly extending annular flange 40 of the third shaft 22 to secure the third shaft 22 to the second shaft 20. In some aspects of the disclosure, the outwardly extending flange 42 of the second shaft 22 is welded to the inwardly extending flange 40 of the third shaft 22 to secure the aft end portions 20*a* and 22*a* of the second and third shafts 20 and 22, respectively, to each other. It is envisioned that the second shaft 20 can be coupled or secured to the third shaft 22 using other known securement techniques including using splines, press-fitting, or with rivets. The inwardly and outwardly extending flanges 40 and 42 increase the spacing between the second shaft 20 and the third shaft 22 to define an annular cavity 44 between the second and third shafts 20 and 22.

In some aspects of the disclosure, one or more bearings or dampers 46 are positioned in the annular cavity 44 second and third shafts 20 and 22. In some aspects of the disclosure, the bearings or dampers 46 are positioned between the forward end portions 20*a* and 22*a* of the second and third shafts 20 and 22. The bearings or dampers 46 maintain longitudinal alignment between the second and third shafts 20 and 22 and absorb and minimize vibration. It is envisioned that the second shaft 18 can have an outer diameter that closely corresponds to an inner diameter of the third shaft 22 such that width of the annular cavity 44 is minimized. In this configuration, the bearings or dampers 46 may not be necessary, and the inwardly and outwardly extending annular flanges 40 and 42 can be eliminated or have widths of minimal thicknesses.

It is envisioned that the shaft assembly 12 can include multiple shafts, e.g., 5 or 7, to further increase the amount of relative twist between the aft end 25*a* of the shaft assembly 12 and the forward end 25*b* of the shaft assembly 12. Each of the shafts of the shaft assembly 12 twists in relation to adjacent shafts such that the overall twist of the shaft assembly 12 between the aft end 25*a* of the shaft assembly 12 and the forward end 25*b* of the shaft assembly 12 is the sum of the twist in all the shafts 18, 20, and 22.

The shaft assembly 12 increases the length of the load path between the torque generating device 24 and the torque receiving device 26 over an axial length as compared to that of a single shaft connector. More specifically, the load or torque of the torque generating device 24 passes from the torque generating device 24 through the length of the first shaft 18, back through the length of the second shaft 20, and through the length of the third shaft 22. Thus, over a given axial length, the length of the load path is multiplied by a factor of about 3 where three shafts are used to form the shaft assembly 12. As such, the phase difference or twist in the shaft assembly 12 occurs along the axial length of each of the first, second, and third shafts 18, 20, and 22 to increase the total phase shift or twist between the aft end 25*a* and the forward end 25*b* of the shaft assembly 12. This allows for the twist necessary to obtain accurate torque measurements over a shorter axial length with the shaft assembly 12 as compared to that of a single shaft coupling.

Figure 3:
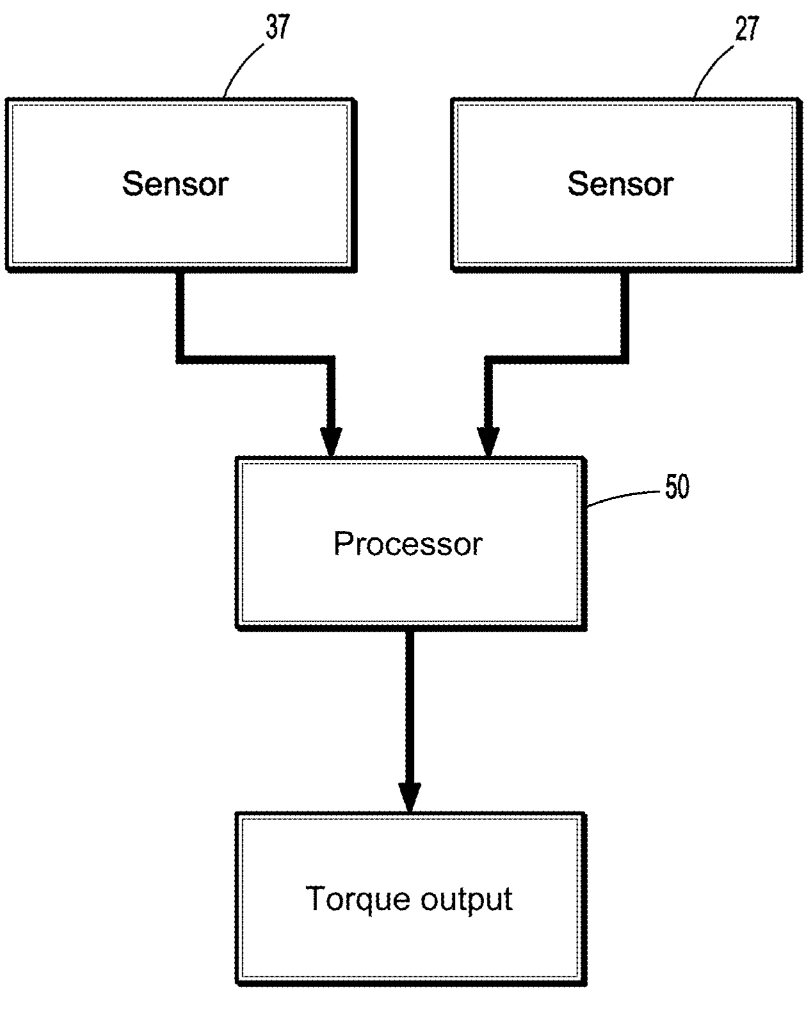
FIG. 3 is a block diagram of a control system of the torque measurement system shown in FIG. 1.

The first sensor 14 is aligned with and monitors the reference targets 27 which are secured to the aft end portion 18*a* of the first shaft 18, and the second sensor 16 is aligned with and monitors the reference targets 37 on the forward end 22*b* of the third shaft 22 to identify angular deformation or twist in the shaft assembly 12 between the forward end 25*b* of the shaft assembly 12 and the aft end 25*a* of the shaft assembly 12. The first sensor 14 and the second sensor 16 are operably coupled to a processor 50 (FIG. 3) which receives a first signal generated by the first sensor 16 and a second signal generated by the second sensor 14 to determine the angular deformation of the shaft assembly 12 and calculate an output proportional to the torque applied to the torque receiving device 26.

The first and second sensors 14 and 16 can be of a variety of different types including magnetic sensors and optical sensors. In addition, the reference targets 27 and 37 can be of a variety of different types and quantity. As illustrated, the shaft assembly 12 can have four reference targets 27 and 37 on each of the aft end 25*a* and the forward end 25*b* of the shaft assembly 12, although two or more reference targets 27 and 37 can be provided. In one aspect of the disclosure, the first and second sensors 14 and 16 are variable reluctance sensors and the reference targets 27 and 37 include toothed wheels that are coupled to the aft end 25*a* and the forward end 25*b* of the shaft assembly 12.

The reference targets 27 and 37 are critical for accurately determining the phase difference or twist of the shaft assembly 12 between the reference targets 27 and the reference targets 37. The reference targets 27 and 37 in conjunction with the sensors 14 and 16 measure the phase shift or twist in the shaft assembly 12. In aspects of the disclosure, the reference targets 27 and 37 can include machined teeth or splines formed on the shaft assembly 12, an array of machined slots or holes, magnetic targets or reference rings, coded optical disks, inductive coils or targets, and/or capacitive disks or plates. The sensors 14 and 16 function to measure the position of the shaft assembly 12 at two spaced positions to determine phase shift or twist. These sensors can include optical encoders, magnetic encoders, electromagnetic induction sensors, laser-based sensors, capacitive sensors, etc.

The torque measurement system 10 can be used to measure torque in any system having a rotating shaft for driving a load. In aerospace applications, a gas turbine engine provides thrust to propel the aircraft and provides power for engine accessories and aircraft accessories. The disclosed torque measurement system 10 can be incorporated between the gas turbine engine and any of the accessories to measure torque. Engine accessories include an engine control unit, a starter, fuel pumps, and oil pumps. Aircraft accessories include hydraulic pumps and electric generators to supply hydraulic and electrical power to the aircraft systems. The torque measurement system 10 can be incorporated into any of the main or auxiliary systems to determine torque to provide information critical for a variety of applications. More particularly, torque sensors help monitor engine performance by providing data on power output to allow for real-time analysis of engine efficiency and optimization of fuel usage. The data from torque sensors is used as input to the engine's control system such that the control system can adjust fuel flow, throttle position, and other parameters to maintain desired engine performance. Monitoring torque can provide an indication of wear and tear or impending failure of engine components such as the compressor, turbine blades, or bearings. In engines with multiple shafts or stages, torque sensors are used to balance load distribution between the different shafts or stages to ensure smooth operation and reduce mechanical stress. Torque sensors also help calculate mechanical power output of the turbine, which is essential for applications like electricity generation or propulsion of the aircraft.

The diameter and thickness of the first shaft 18, the second shaft 20, and third shaft 22 can be selected to achieve the desired angular deformation or twist from the shaft assembly for a given load. It is noted that diameter and thickness of the first shaft 18, the second shaft 20, and third shaft 22 can be different from each other or identical to each other and can be selected to achieve the desired angular deformation or twist from the shaft assembly for a given load. The angular deformation or twist in the first shaft 18, the second shaft 20, and the third shaft 22 need not be the same for a given load but will depend on the diameter and thickness of the different shafts.

The use of phase shift torque sensors to measure torque sometimes requires extension of the length, or reduction in the thickness, of a shaft between the torque generating device and the torque receiving device to obtain sufficient twist in the shaft to obtain accurate torque measurements. The disclosed torque measurement system 10 extends the length of the load path over a given axial distance to allow the axial length of the torque measurement system 10 to be reduced while still achieving sufficient phase shift or twist to obtain accurate torque measurements. As a result, the axial space required to accommodate the turbine engine can be reduced.

Further aspects of the disclosure are provided by the subject matter of the following clauses.

A torque measurement system, comprising: a shaft assembly having a first shaft, a second shaft, and a third shaft coaxially positioned, the first shaft having a first end portion and a second end portion, the first end portion adapted to be coupled to a torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to a torque receiving device, the first end portion of the third shaft secured to the first end portion of the second shaft and supporting second reference targets; a first sensor positioned adjacent to the first reference targets; a second sensor positioned adjacent to the second reference targets; and a processor operably coupled to the first sensor and to the second sensor, the processor receiving a first signal generated by the first sensor and a second signal generated by the second sensor to determine the angular deformation of the shaft assembly and calculate an output proportional to the torque applied to the torque receiving device.

The torque measurement system according to any other clause, wherein the first shaft defines a hollow bore that extends from the second end portion of the first shaft towards the first end portion of the first shaft.

The torque measurement system according to any other clause, further including a first dampener positioned between the first shaft and the second shaft.

The torque measurement system according to any other clause, further including a second dampener positioned between the second shaft and the third shaft.

The torque measurement system according to any other clause, wherein the second end portion of the first shaft includes an outwardly extending annular flange and the second end portion of the second shaft includes an inwardly extending annular flange, the outwardly extending annular flange secured to the inwardly extending annular flange.

The torque measurement system according to any other clause, wherein the first end portion of the second shaft includes an outwardly extending annular flange and the first end portion of the third shaft includes an inwardly extending annular flange, the outwardly extending annular flange of the second shaft secured to the inwardly extending annular flange of the third shaft.

The torque measurement system according to any other clause, wherein the outwardly extending flange of the first shaft and the inwardly extending flange of the second shaft are secured together by welding, press-fitting, splines, or with rivets, and the outwardly extending flange of the second shaft and the inwardly extending flange of the third shaft are secured together by welding, press-fitting, splines, or with rivets.

A load coupling shaft assembly comprising: a first shaft, a second shaft, and a third shaft coaxially positioned, the first shaft having a first end portion and a second end portion, the first end portion adapted to be coupled to a torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to a torque receiving device, the first end portion of the third shaft secured to the first end portion of the second shaft and supporting second reference targets.

The load coupling shaft assembly according to any other clause, wherein the first shaft defines a hollow bore that extends from the second end portion of the first shaft towards the first end portion of the first shaft.

The load coupling shaft assembly according to any other clause, further including a first dampener positioned between the first shaft and the second shaft.

The load coupling shaft assembly according to any other clause, further including a second dampener positioned between the second shaft and the third shaft.

The load coupling shaft assembly according to any other clause, wherein the second end portion of the first shaft includes an outwardly extending annular flange and the second end portion of the second shaft includes an inwardly extending annular flange, the outwardly extending annular flange secured to the inwardly extending annular flange.

The load coupling shaft assembly according to any other clause, wherein the first end portion of the second shaft includes an outwardly extending annular flange and the first end portion of the third shaft includes an inwardly extending annular flange, the outwardly extending annular flange of the second shaft secured to the inwardly extending annular flange of the third shaft.

The load coupling shaft assembly according to any other clause, wherein the outwardly extending flange of the first shaft and the inwardly extending flange of the second shaft are secured together by welding, press-fitting, splines, or with rivets, and the outwardly extending flange of the second shaft and the inwardly extending flange of the third shaft are secured together by welding, press-fitting, splines, or with rivets.

A rotating machine and torque measurement system, comprising: a torque generating device; a torque receiving device; a shaft assembly having a first shaft, a second shaft, and a third shaft coaxially positioned, the first shaft having a first end portion and a second end portion, the first end portion adapted to be coupled to the torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to the torque receiving device, the first end portion of the third shaft secured to the first end portion of the second shaft and supporting second reference targets; a first sensor positioned adjacent to the first reference targets; a second sensor positioned adjacent to the second reference targets; and a processor operably coupled to the first sensor and to the second sensor, the processor receiving a first signal generated by the first sensor and a second signal generated by the second sensor to determine the angular deformation of the shaft assembly and calculate an output proportional to the torque applied to the torque receiving device.

The rotating machine and torque measurement system according to any other clause, wherein the torque generating device is a gas turbine engine or any rotating device capable of delivering torque.

The rotating machine and torque measurement system according to any other clause, wherein the torque receiving device is an electric generator, a pump, or a turbine engine.

The rotating machine and torque measurement system according to any other clause, wherein the first shaft defines a hollow bore that extends from the second end portion of the first shaft towards the first end portion of the first shaft.

The rotating machine and torque measurement system according to any other clause, further including a first dampener positioned between the first shaft and the second shaft.

The rotating machine and torque measurement system according to any other clause, further including a second dampener positioned between the second shaft and the third shaft.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the disclosure is not limited to the precise aspects described, and that various other changes and modifications may be affected by one skilled in the art without departing from the scope or spirit of the disclosure. Additionally, the elements and features shown or described in connection with certain aspects may be combined with the elements and features of certain other aspects without departing from the scope of the disclosure, and that such modifications and variations are also included within the scope of the disclosure. Accordingly, the subject matter of the disclosure is not limited by what has been particularly shown and described.

What is claimed is:

1. A torque measurement system, comprising:

a shaft assembly having a first shaft, a second shaft, and a third shaft coaxially positioned, the first shaft having a first end portion and a second end portion, the first end portion adapted to be coupled to a torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to a torque receiving device, the first end portion of the third shaft secured to the first end portion of the second shaft and supporting second reference targets;

a first sensor positioned adjacent to the first reference targets;

a second sensor positioned adjacent to the second reference targets; and a processor operably coupled to the first sensor and to the second sensor, the processor receiving a first signal generated by the first sensor and a second signal generated by the second sensor to determine the angular deformation of the shaft assembly and calculate an output proportional to the torque applied to the torque receiving device.

2. The torque measurement system of claim 1, wherein the first shaft defines a hollow bore that extends from the second end portion of the first shaft towards the first end portion of the first shaft.

3. The torque measurement system of claim 1, further including a first dampener positioned between the first shaft and the second shaft.

4. The torque measurement system of claim 3, further including a second dampener positioned between the second shaft and the third shaft.

5. The torque measurement system of claim 1, wherein the second end portion of the first shaft includes an outwardly extending annular flange and the second end portion of the second shaft includes an inwardly extending annular flange, the outwardly extending annular flange secured to the inwardly extending annular flange.

6. The torque measurement system of claim 5, wherein the first end portion of the second shaft includes an outwardly extending annular flange and the first end portion of the third shaft includes an inwardly extending annular flange, the outwardly extending annular flange of the second shaft secured to the inwardly extending annular flange of the third shaft.

7. The torque measurement system of claim 6, wherein the outwardly extending flange of the first shaft and the inwardly extending flange of the second shaft are secured together by welding, splines, press-fitting, or with rivets, and the outwardly extending flange of the second shaft and the inwardly extending flange of the third shaft are secured together by welding, splines, press-fitting, or with rivets.

8. A load coupling shaft assembly comprising:

a first shaft, a second shaft, and a third shaft coaxially positioned, the first shaft having a first end portion and a second end portion, the first end portion adapted to be coupled to a torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to a torque receiving device, the first end portion of the third shaft secured to the first end portion of the second shaft and supporting second reference targets.

9. The load coupling shaft assembly of claim 8, wherein the first shaft defines a hollow bore that extends from the second end portion of the first shaft towards the first end portion of the first shaft.

10. The load coupling shaft assembly of claim 8, further including a first dampener positioned between the first shaft and the second shaft.

11. The load coupling shaft assembly of claim 10, further including a second dampener positioned between the second shaft and the third shaft.

12. The load coupling shaft assembly of claim 8, wherein the second end portion of the first shaft includes an outwardly extending annular flange and the second end portion of the second shaft includes an inwardly extending annular flange, the outwardly extending annular flange secured to the inwardly extending annular flange.

13. The load coupling shaft assembly of claim 12, wherein the first end portion of the second shaft includes an outwardly extending annular flange and the first end portion of the third shaft includes an inwardly extending annular flange, the outwardly extending annular flange of the second shaft secured to the inwardly extending annular flange of the third shaft.

14. The load coupling shaft assembly of claim 13, wherein the outwardly extending flange of the first shaft and the inwardly extending flange of the second shaft are secured together by welding, press-fitting, or with rivets and the outwardly extending flange of the second shaft and the inwardly extending flange of the third shaft are secured together by welding, press-fitting, or with rivets.

15. A rotating machine and torque measurement system, comprising:

a torque generating device;

a torque receiving device;

a shaft assembly having a first shaft, a second shaft, and a third shaft coaxially positioned, the first shaft having a first end portion and a second end portion, the first end portion adapted to be coupled to the torque generating device and supporting first reference targets, the second shaft having a cylindrical configuration and defining a first cavity that receives the first shaft, the second shaft having a first end portion and a second end portion, the second end portion of the second shaft secured to the second end portion of the first shaft, the third shaft having a cylindrical configuration and defining a second cavity that receives the second shaft, the third shaft having a first end portion and a second end portion, the second end portion of the third shaft adapted to be coupled to the torque receiving device, the first end portion of the third shaft secured to the first end portion of the second shaft and supporting second reference targets;

a first sensor positioned adjacent to the first reference targets;

a second sensor positioned adjacent to the second reference targets; and a processor operably coupled to the first sensor and to the second sensor, the processor receiving a first signal generated by the first sensor and a second signal generated by the second sensor to determine the angular deformation of the shaft assembly and calculate an output proportional to the torque applied to the torque receiving device.

16. The rotating machine and torque measurement system of claim 15, wherein the torque generating device is a gas turbine engine or any rotating device capable of delivering torque.

17. The rotating machine and torque measurement system of claim 15, wherein the torque receiving device is an electric generator, a pump, or a turbine engine.

18. The rotating machine and torque measurement system of claim 15, wherein the first shaft defines a hollow bore that extends from the second end portion of the first shaft towards the first end portion of the first shaft.

19. The rotating machine and torque measurement system of claim 15, further including a first dampener positioned between the first shaft and the second shaft.

20. The rotating machine and torque measurement system of claim 19, further including a second dampener positioned between the second shaft and the third shaft.

* * * * *